United States Patent [19]

Burel et al.

[11] Patent Number: 5,321,771

[45] Date of Patent: Jun. 14, 1994

[54] METHOD AND DEVICE FOR AUTOMATIC IMAGE SEGMENTATION BY TEXTURAL ANALYSIS

[75] Inventors: Gilles Burel; Jean-Yves Catros, both of Rennes, France

[73] Assignee: Thomson-CSF, Puteaux, France

[21] Appl. No.: 982,156

[22] Filed: Nov. 25, 1992

Related U.S. Application Data

[63] Continuation of Ser. No. 700,188, May 30, 1991, abandoned.

[30] Foreign Application Priority Data

Oct. 3, 1989 [FR] France .................................. 89 12894

[51] Int. Cl.$^5$ ............................................... G06K 9/46
[52] U.S. Cl. ..................................... 382/28; 382/14; 382/15; 382/16
[58] Field of Search .................... 382/14, 15, 28, 10, 382/16, 27

[56] References Cited

U.S. PATENT DOCUMENTS

| | | | |
|---|---|---|---|
| 4,745,633 | 5/1988 | Waksman et al. | 382/56 |
| 4,897,881 | 1/1990 | Ledinh et al. | 382/28 |
| 5,003,490 | 3/1991 | Castelaz et al. | 382/15 |
| 5,052,043 | 9/1991 | Gaborski | 382/14 |
| 5,060,277 | 10/1991 | Bokser | 382/14 |

OTHER PUBLICATIONS

Araujo et al., *A Parallel Architecture for Texture Analysis Based on the Concept of Associative Memory*, Proceeding IEEE International Symposium on Intelligent Conrol, Aug. 24–26, 1988, pp. 633–637.

Glover, *An Optical Fourier/Electronic Neurocomputer Automated Inspection System*, IEEE International Conference on Neural Networks, Jul. 24–27, 1988, pp. 569–576.

Dupaguntla et al., *A Neural Network Architecture for Texture Segmentation and Labelling*, International Joint Conference on Neural Networks, Jun. 18–22, 1989, pp. 127–133.

Pattern Recognition Letters, vol. 2, No. 3, Mar. 1984, Elsevier Science Publishers B.V., (Amsterdam, NL), M. Unser et al.: "Feature extraction and decision procedure for automated inspection of texture materials", pp. 185–191 voir p. 186, col. 1, lignes 24–30, 34–36; p. 186, col. 2, lignes 26–36; p. 189, col. 1, lignes 5–9; p. 189, col. 2, lignes 18–22.

IEEE Proceedings on Pattern Recognition and Image Processing, Jun. 14–17, 1982, Las Vegas, Nevada, IEEE, (New York, US), A. K. C. Wong et al.: "Search-effective multi-class texture classification", pp. 208–213 voir abrege; p. 210, col. 2, lignes 39–45; p. 212, col. 1, lignes 34–40.

*Primary Examiner*—Joseph Mancuso
*Assistant Examiner*—Steven P. Klocinski
*Attorney, Agent, or Firm*—Oblon, Spivak, McClelland, Maier & Neustadt

[57] ABSTRACT

A device for automatic image segmentation according to the invention comprises a data processor associated with a network of automata organized in three levels; the inputs of each of the automata are weighted by adjustable coefficients; the number of automata of the first level is equal to the number of characteristic values computed from observation windows taken firstly in a set of examples of image zones having different textures. Learning by the network permits adjustment of the weighting coefficients of the automata of the network until all the examples of the same texture lead to the same configuration.

6 Claims, 6 Drawing Sheets

FIG_1
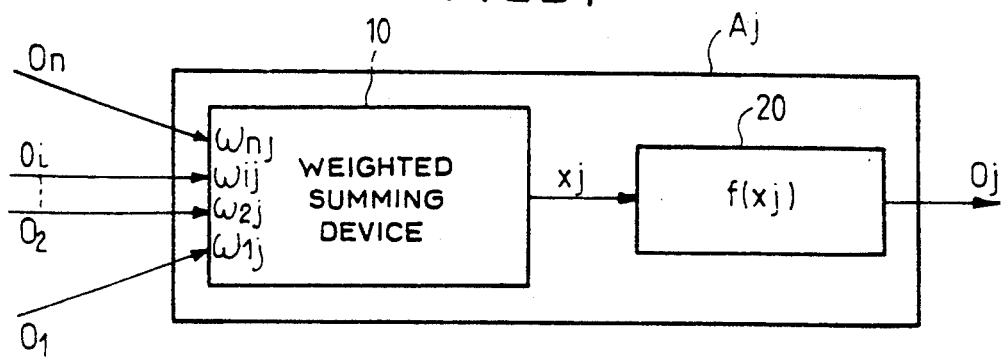
FIG_2
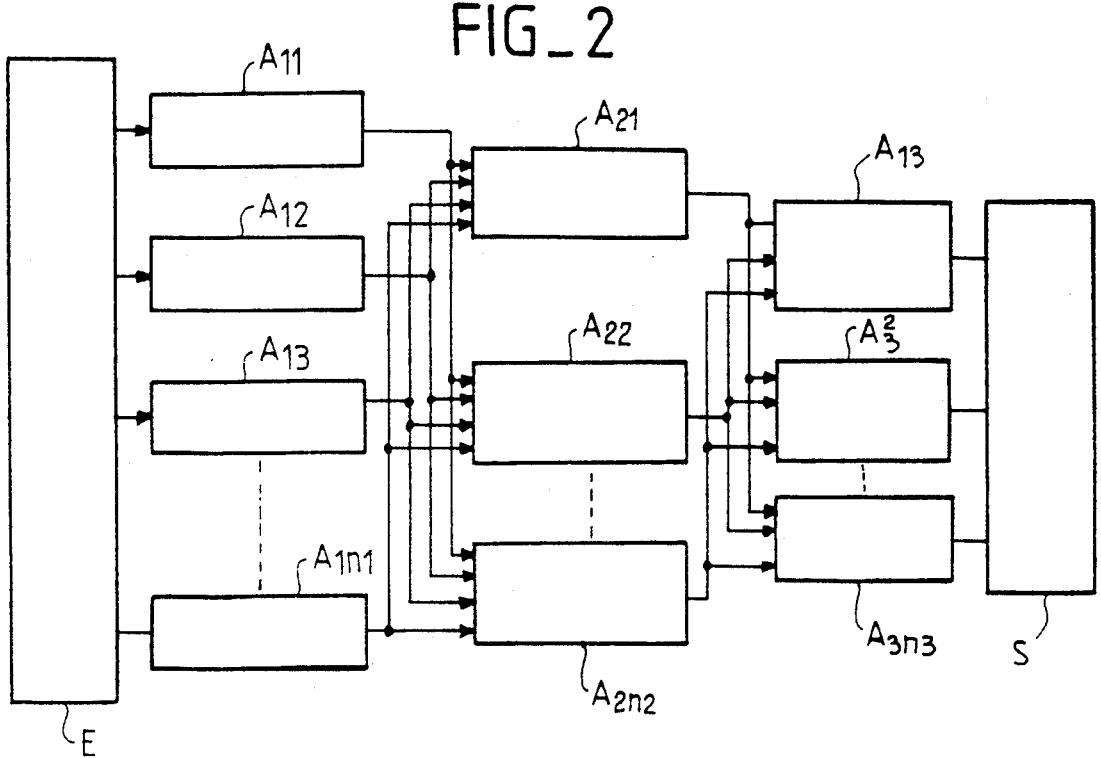
FIG_3
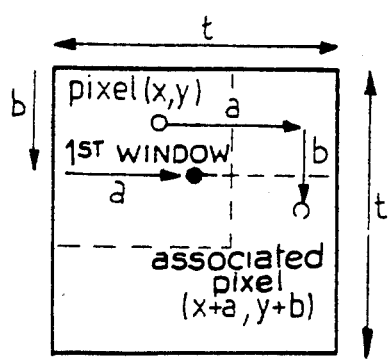

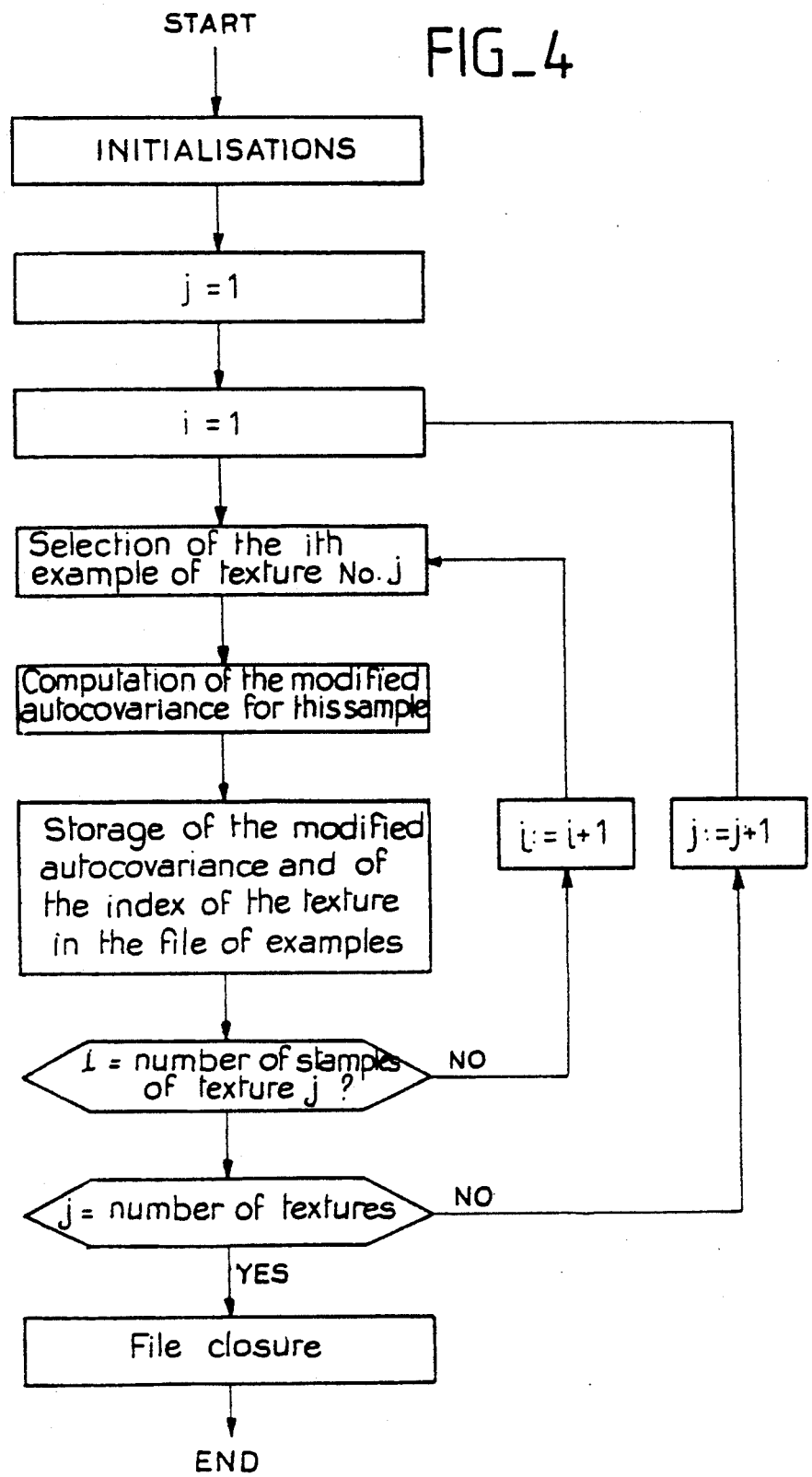

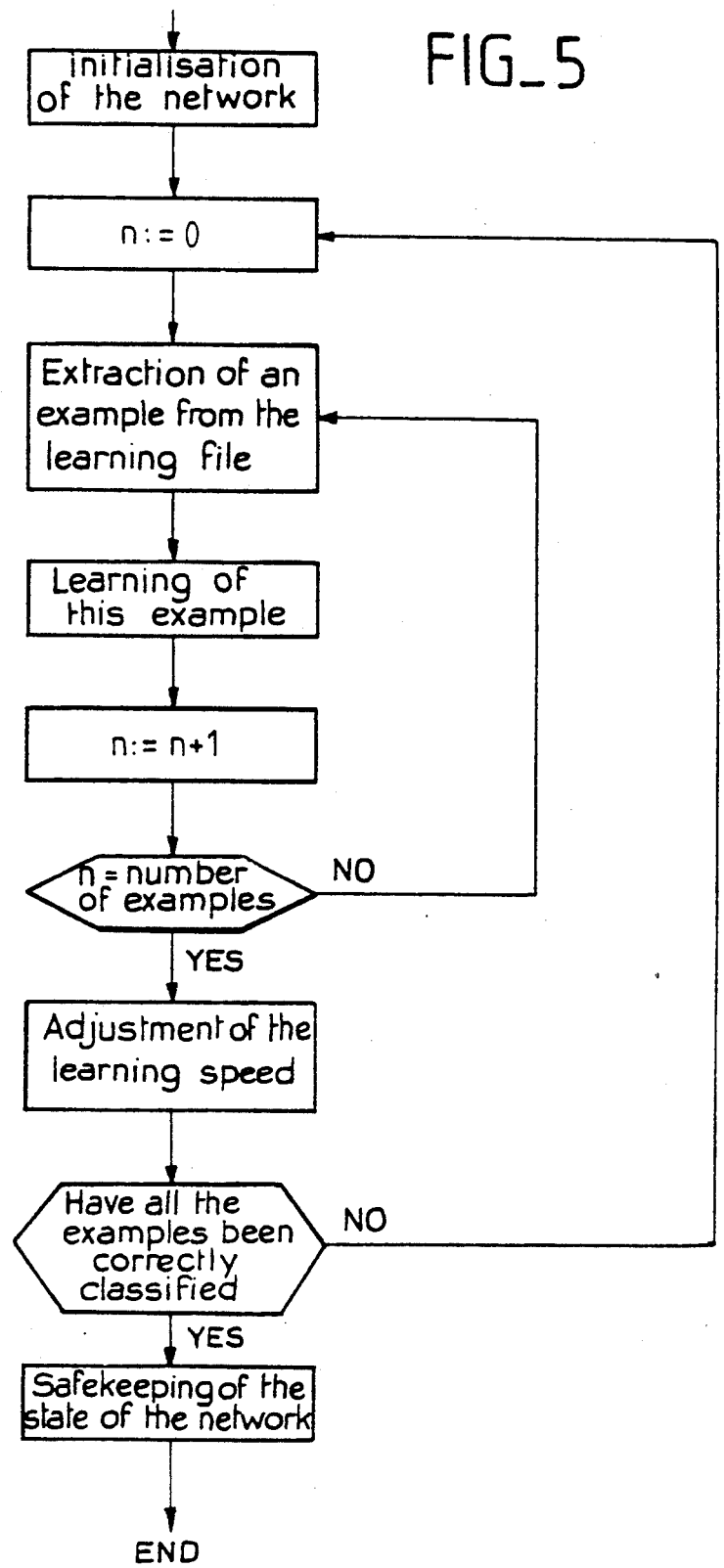

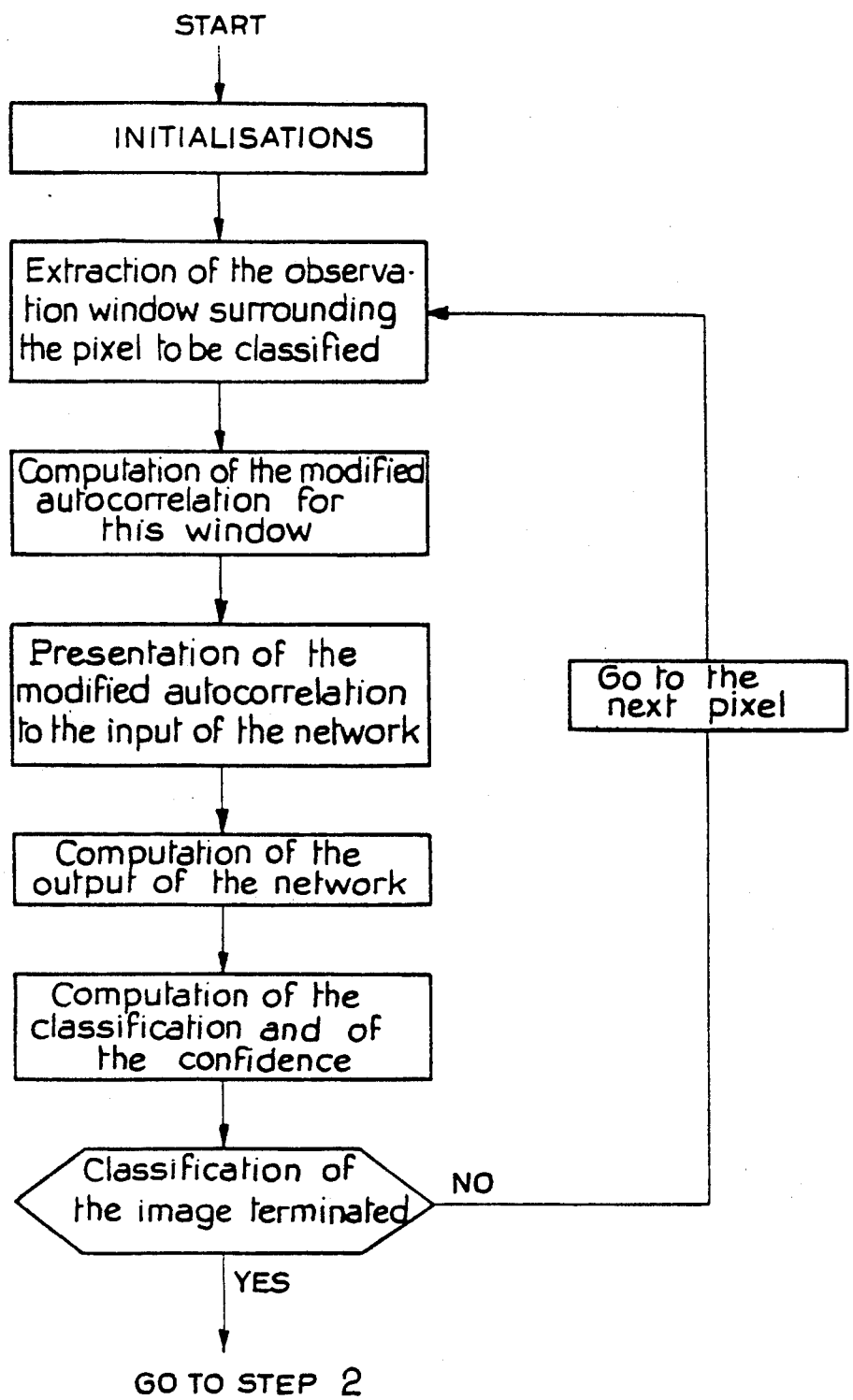

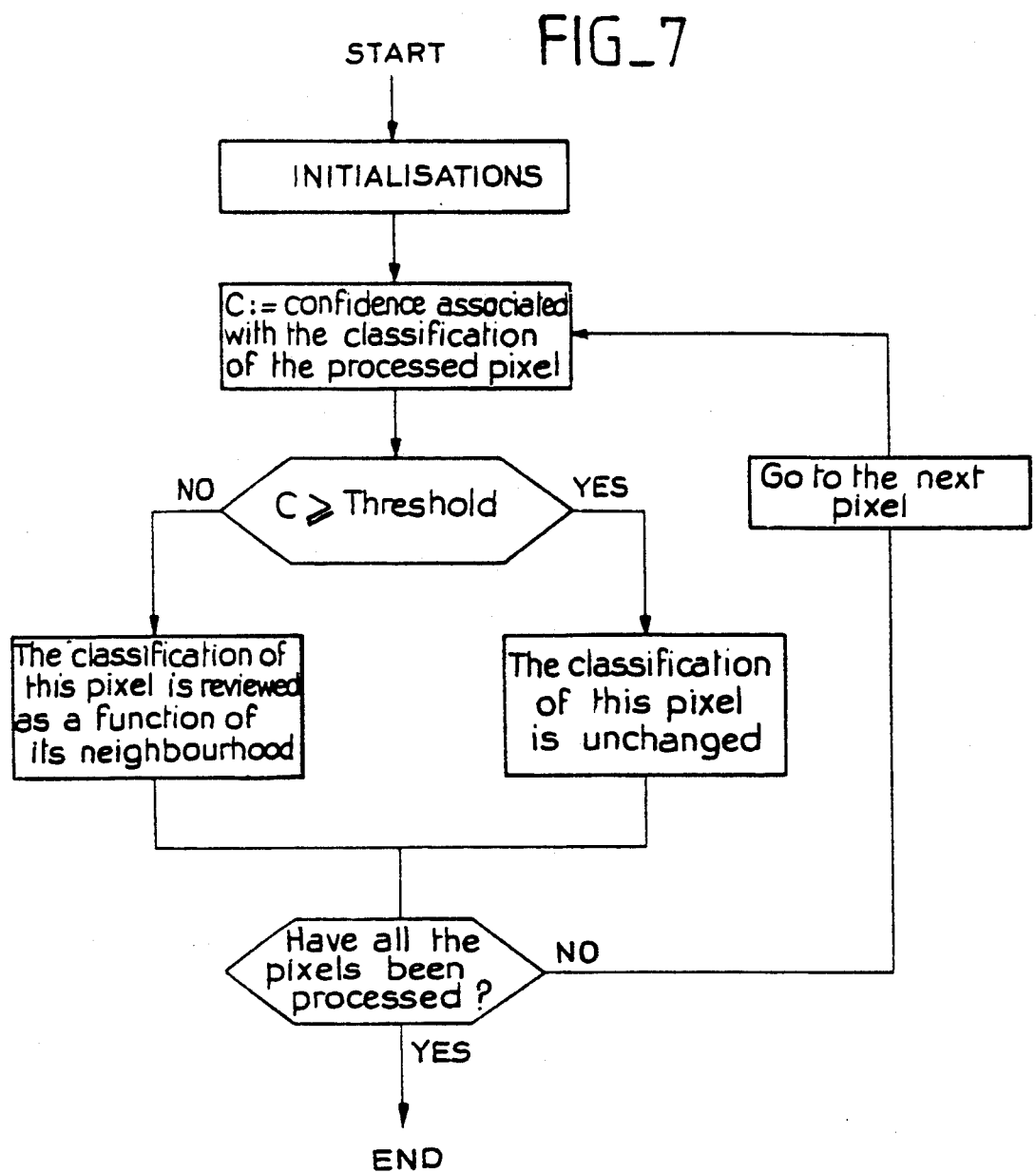

METHOD AND DEVICE FOR AUTOMATIC IMAGE SEGMENTATION BY TEXTURAL ANALYSIS

This application is a continuation of application Ser. No. 07/700,188, filed on May 30, 1991, now abandoned.

BACKGROUND OF THE INVENTION

1. Field of the Invention

The invention relates to the field of automatic computer analysis of images and in particular to a method, and to the corresponding device for automatic segmentation of images through analysis of their texture.

Texture is an important characteristic for the analysis, segmentation and classification of images, in particular when the latter are of low contrast. Perception of textures is closely related to the visual system: this surface property perceived by the observer is considered to be homogeneous and therefore translation invariant for a zone of the same type. Observation of a texture leaves the same visual impression whatever the portion of the texture observed.

The problem to be resolved when analysing the textures in an image is to mark out the modifications of texture on the basis of an observation window moved over image.

2. Discussion of the Background

Numerous methods have been proposed for analysing textures. These methods can be grouped into four distinct families depending on the parameters analysed:

- methods proceeding by analysis of spatial characteristics determine the period of repetition of an elementary motif;
- methods proceeding by analysis of the frequency characteristics use Fourier transform computations to search for characteristic frequencies;
- methods operating by analysis following coevent matrices using a more complicated formalism, performing, around each point and for all the possible directions, statistical analyses on the grey level repetitions;
- methods operating by structuralist analysis, implementing artificial intelligence.

These methods are described in detail in the following documents:

- A. GAGALOWICZ "Towards a model of textures" PhD Thesis in mathematical sciences, University of Paris IV-1983.
- S. RABOISSON "Numerical image processing by characterisation of textures. Application to the segmentation of echograph images" MSc Thesis in information processing - University of Rennes I-1985.

The existing methods therefore necessitate a modelling of the concept of texture by statistical or structuralist models and these methods fail when the textures present in the image to be analysed are not describable by the model and therefore cannot be marked out.

SUMMARY OF THE INVENTION

The subject of the invention is a method of textural analysis using a different approach, according to which learning by a network of automata is performed in an initial phase on the basis of textural samples analysed by the system, the system being at the end of this learning phase in a position to detect any texture close to one of the textures presented in the initial phase. Thus, when learning is terminated the system is capable of classifying the regions of an image on the basis of an observation window moving over this image.

According, to the invention, a method of automatic segmentation by textural analysis, is characterized in that:

in an initial phase, a file of several examples of each of several textures is created from sets of characteristic values, each set being representative of a sample of a given texture, then, in a learning phase, these sets of values are used to adjust by successive approximations, weighting coefficients of a network of automata, until the outputs of this network are as close as possible to a configuration characteristic of a given texture, for all the examples of this texture, each of the textures being associated with a characteristic configuration, then, in a classification phase, the images are processed by computing sets of characteristic values of zones delimited by an observation window moved in the image, each set of characteristic values of a zone, which set is applied to the input of the network of automata, leading to an output configuration of this network, from which configuration are determined one texture from those learned in the learning phase, and an associated confidence value which is a function of a disparity between the output configuration obtained and that associated with this determined texture.

The invention will be better understood and other characteristics will emerge with the aid of the description with reference to the attached figures.

FIG. 1 is the general diagram of an elementary automaton of the device according to the invention;

FIG. 2 is the general diagram of the whole of the automaton used in the device for image segmentation by textural analysis according to the invention;

FIG. 3 represents diagrammatically the observation window and the associating of pixels in order to compute a particular value of the correlation;

FIG. 4 is the flow diagram of the phase of creation of the file of examples;

FIG. 5 is the flow diagram of the learning phase;

FIGS. 6 and 7 are the flow diagrams of the first and second step respectively of the classification phase;

Figure 8C:
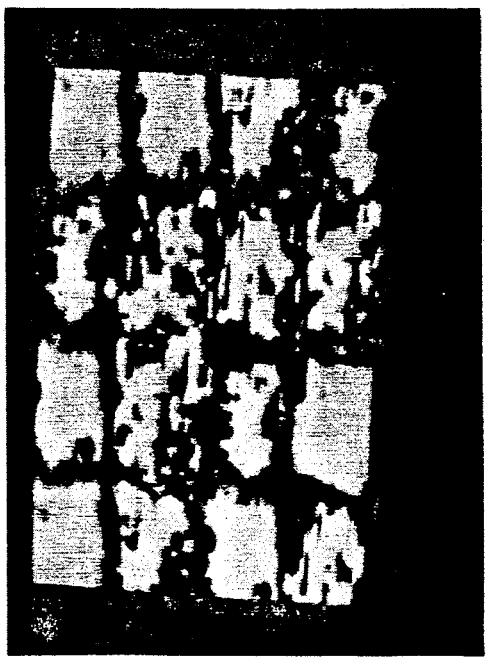
FIGS. 8a, 8b, 8c and 8d illustrate the results obtained on an example.

As indicated above, the known methods for image segmentation by textural analysis necessitate models, and are therefore restricted to one or more particular textural types. To remedy this disadvantage, the device for image segmentation by textural analysis according to the invention uses, for the classification of textures, a network of automata whose number of degrees of freedom is sufficient to be able, by fixing these various degrees, to obtain as output from the automation the expected result for a set of so-called "learned" textures, this automaton being able subsequently to be used for unknown images and to give the textural type recognised in the various zones, by analogy with the textures learned. Thus, the performance of the device can be increased simply by widening the learning base, and the device is not limited to one or more particular textural types able to be characterized by models, as in the prior devices.

For this purpose, the segmentation device according to the invention comprises a data processor (not shown)

associated with a network of automata according to the invention comprising a set of elementary automata of the type of that represented in FIG. 1. This automaton comprises principally a weighted summing device 10 associated with a function computing device 20. The values at the inputs $O_1, O_2, \ldots O_i, O_n$ of the weighted summing device 10 are multiplied by coefficients, $w_{1j}, w_{2j} \ldots w_{ij} \ldots w_{nj}$ respectively then added to form an intermediate value $x_j$ to which is applied a corresponding function computation, $f(x_j)$, which furnishes the value of the output $O_j$ of this elementary automaton $A_j$. Preferably the function used is the hyperbolic tangent function which makes it possible to tend, for the output $O_j$, to one or other of the values $+1$ or $-1$ when the intermediate values $x_j$ increase in absolute value.

The network of automata using such elementary automata is organised, in several levels, in such a way that, by taking account of characteristic values computed on examples, the weighting coefficients evolve in the course of learning until the last-level automata of the network furnish, for all the examples of a given texture, a coefficient close to 1 on the output of the automaton corresponding to this texture, and coefficients close to $-1$ on the set of outputs of the other automata.

The characteristic values computed on the various examples of each of the textures, then on the images to be analysed, are the values of an autocorrelation function, calculated for various movements in an observation window.

The network of automata which is represented in FIG. 2 is constituted in the following ways:

At the first level, the number of inputs and the number of automata are equal to the number of characteristic values computed for each observation window, single-input automata being provided at this level, the weighted summing device being reduced to a simple multiplier by 1. By way of example, for a $t \times t$-pixel observation window in which the horizontal correlation related movement varies from 0 to $(h-1)$, and the vertical movement from $-(h-1)$ to 0, then from 0 to $(h-1)$, $2h^2$ values of the autocorrelation function are computed for each observation window. The number of inputs of the network of automata is therefore equal to $n_1 = 2h^2$, and the number of automata $A_{11}, A_{12} \ldots A_{1n1}$ corresponding to the first level is also equal to $n_1$.

At the second level, a number $n_2$ of automata $A_{21}, A_{22} \ldots A_{2n2}$ lying between the value $n_3$ of the number of automata of the last level and the number of examples are provided, each of the automata of the second level having $n_1$ inputs connected to the $n_1$ outputs of the automata of the first level. By way of example, the number $n_2$ of automata of the second level can be equal to half the number of examples.

At the third level, $n_3$ automata $A_{31}, A_{32} \ldots A_{3n3}$ are provided, equal in number to the various textures characterised by the examples used in the learning phase, and which will therefore be recognisable in the images in a subsequent classification phase. As at the preceding level the automata of the last level are connected to each of the outputs of the second level.

The device operates in the following way:

A pre-processing is carried out on an observation window, whether this be a window in an example used for learning, or an observation window taken in an image to be processed. Such a $t \times t$ pixel-sized observation window is illustrated in FIG. 3, inside which the coordinates of a current pixel have been denoted x and y. In this observation window, an $h \times h$-sized correlation window is moved in order to compute the values of the autocorrelation function $C(a,b)$ from the luminance values $f(x,y)$ of the pixel with coordinates $(x,y)$. This normalised autocorrelation function is computed through the following formula:

$$C(a, b) = \frac{\sum_{x=0}^{t-a-1} \sum_{y=0}^{t-b-1} f_1(x, y) f_2(x + a, y + b)}{\left\{ \sum_{x=0}^{t-a-1} \sum_{y=0}^{t-b-1} f_1^2(x, y) \right\} \left\{ \sum_{x=0}^{t-a-1} \sum_{y=0}^{t-b-1} f_2^2(x + a, y + b) \right\}} \quad (1)$$

$$\text{where: } f_1(x, y) = f(x, y) - \frac{\sum_{i=0}^{t-a-1} \sum_{j=0}^{t-b-1} f(i, j)}{(t - a)(t - b)}$$

$$f_2(x + a, y + b) = f(x + a, y + b) - \frac{\sum_{i=0}^{t-a-1} \sum_{j=0}^{t-b-1} f(i + a, j + b)}{(t - a)(t - b)}$$

By way of example the observation window can have a size of $25 \times 25$ pixels, and the extent of the correlation a size of $16 \times 16$ pixels, which gives 16 possible movements for a lying between 0 and 15 and b lying between 0 and 15, a and b being the respectively horizontal and vertical movements in the window.

In a more general way, the function is computed at first for $0 \leq a \leq h$ and $0 \leq b \leq h$ then for $0 \leq a \leq h$ and $-h \leq b \leq 0$. Thus, the computations in an observation window give in total $2h^2$ values which are the $2h^2$ values which are presented to the input of the network of automata. h is a user-determined parameter lying between 2 and $t-2$ which can advantageously be chosen equal to the integer part of $2t/3$.

In the phase of creation of a file of examples, these computations are performed for several examples of each of the various textures. For example for the processing of aerial images 15 examples of textures characteristic of forests can be used and for each of these examples the $2h^2$ values of the modified autocorrelation function are computed and stored. The same thing is done for another type of texture, for example a texture characteristic of roads, and this by means of several samples. This operation is repeated for a set of other textures of examples which will be "learned" by the network of automata. The flow diagram represented in FIG. 4 illustrates this phase of creation of the file of examples.

An initialisation step fixes the number of examples of each of the textures, intended to form the base of examples. For the first example $(i=1)$ of the index 1 texture $(j=1)$, computation of the $2h^2$ values of the normalised autocorrelation function is performed, then these values are stored, with the index of the corresponding texture.

This operation is performed for all the examples of the index 2 texture..., and finally for all the examples of all the textures to be "learned", all the examples having been processed and the corresponding values stored, the examples base is complete and the corresponding file is closed.

As indicated above, on the basis of this set of values calculated for each of the examples of each of the textures, a phase of learning of these examples by the network of automata aiming to adjust the weighting coefficients is performed. For this purpose, the various weighting coefficients are adjusted, from arbitrary starting values, by successive approximations, using all the examples, generally several times, and in any random order and in such a way that at the end of the learning phase an example characteristic of a given texture leads to the obtaining of a coefficient which is as close as possible to 1 on the output characteristic of this texture, and also as close as possible to −1 on the other outputs, and this for each of the textures.

This learning is performed in the following way described hereinafter with reference to FIG. 5. First of all a phase of initialisation of the weighting coefficients is performed, these coefficients being randomly initialised by using a probability law which is uniform in the interval −M, +M ; the value of M is chosen equal to $2/\sqrt{n_1}$ for the automata of the second layer, and being chosen at $2/\sqrt{n_2}$ for the automata of layer 3.

Learning then consists in the modification of the values of the weighting coefficients $w_{ij}$, until the desired result is obtained, these coefficients being modified after each presentation of an example. This modification progresses in the following way: at a given iteration stage k, an example is drawn from the base of examples and the values of the modified autocorrelation function which were computed for this example of a given texture are applied to the inputs of the network; the corresponding outputs of the network are then computed. This example being characteristic of a given texture ought to give, at the end of the learning, a coefficient +1 or about +1 as output from the automation associated with this texture, the outputs of the other automata of the last level giving negative values which are as close as possible to −1. The output values of the network are therefore compared to the output values desired:

Let $E_j$ be the error in the output relative to the desired output measured by the value $\frac{1}{2}(O_j - S_j)^2$ when $|O_j - S_j|$ is less than or equal to 1 and by $(x_j - 1)/2$ if $|O_j - S_j|$ is greater than 1.

The total output error E is then the sum of the errors $E_j$ thus computed for the set of outputs from $j = 1$ to $n_3$.

The values of the weighting coefficients are then modified taking account of the modifications of these weighting coefficients performed at the preceding iteration stage, $k - 1$, and of the derivative of the error function, weighted by a value characteristic of a so-called "learning speed" parameter $\eta$, and of a low-pass filtering parameter $\beta$ (generally chosen equal to 0.98, and in any case always between 0 (inclusive) and 1 (exclusive)) in the following way:

$$\Delta w_{ij}(k) = -\eta \frac{\partial E}{\partial w_{ij}}(k) + \beta \Delta w_{ij}(k-1)$$

This modification of the weighting coefficients makes it possible to vary the weights as an inverse function of the error gradient, whilst still taking account of the variations performed at the preceding iteration, that is to say by performing a low-pass filtering which makes it possible to avoid oscillations in order to conserve the average value of the weighting coefficient.

These coefficients having been modified, a new textural example is drawn from the base forming the file of examples.

The same operation is performed several times, on the basis of all the examples drawn from the base of examples, until the outputs of the network of automata are always in the state corresponding to the textural type used, that is to say that for all the examples, the outputs are close to −1 for all those outputs which do not correspond to the example and close to +1 for that output which corresponds to the example, whatever the example drawn from the base. The thresholds can be fixed in the following way: it can be assumed that the weighting coefficients have the appropriate values when the output coefficient of the automation corresponding to the example is greater than or equal to 0.9 and all the other coefficients equal to or less than −0.9.

It is then assumed that the learning phase of the network of automata is terminated, and that a set of values of autocorrelation characteristic of a window in an image will make it possible to determine the type of texture in this window closest to those learned by the network. The network of automata is then in operating condition.

For the analysis of a complete/image, the observation window is moved in the image, for example 3 by 3 pixels, in order to traverse the whole image. The values of the autocorrelation function are computed in this window for each position and applied to the input of the network. These values applied to the input of the network lead, by application of the weighting coefficients determined in the learning phase, to the obtaining of a value on each of the outputs for the network. It is then assumed that the texture is of the type corresponding to the automaton whose output is of highest level, but there is associated with this textural determination or "classification" a degree of confidence computed in the following way: if $j_1$ is the index of the output automaton whose output is highest, the confidence is measured by the minimum value of the disparity between the output of highest level and all other outputs. By way of example for an automaton in which four different textures have been learned through a set of corresponding examples, if the output of the automaton $A_{13}$ of the last level is equal to −1 that of the automaton $A_{23}$ equal to +0.95, that of the automaton $A_{33}$ equal to −0.35 and that of the automaton $A_{43}$ equal to −0.98, the observation window tested has the texture characterized by output no. 2 and the corresponding confidence is equal to:

$$\tfrac{1}{2}(\min((0.95+1),(0.95+0.35),(0.95+0.98))=0.65.$$

The confidence coefficient having been normalised on dividing by 2 the confidence is a value lying between 0 and 1, the value 1 corresponding to maximum confidence.

For each of the positions of the observation window a classification index, corresponding to a texture learned by the device in the learning phase, is assigned to the central pixel of this window when the window is moved pixel by pixel, or to the n×n-pixel zone surrounding this central pixel when the window is moved n pixels by n pixels, with a corresponding confidence factor. This textural index is assigned to the central pixel of the observation window in a given position.

At the end of this phase, it is possible that isolated pixels or isolated n×n-pixel elementary zones have been assigned textural indices different from the set of those of the set of pixels or of the zones of the neighbourhood. In consequence a processing is performed for the pixels or image zones for which confidence in the classification attributed is less than a threshold fixed by the user, in order to assign it the majority classification in a neighbourhood v, the scope of neighbourhood v also being defined by the user. All the pixels of the neighbourhood vote for their class with a weight equal to their confidence.

At the end of this re-assigning of the points, the classification map is considered correct.

FIGS. 8a, 8b, 8c and 8d illustrate the results obtained on an example.

Figure 8D:
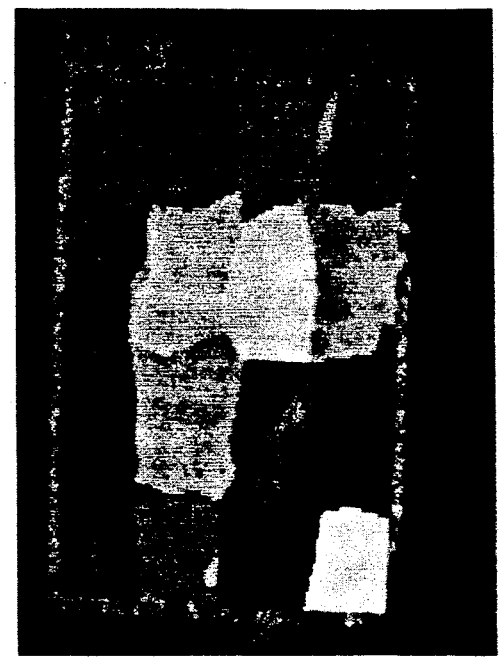
Figure 8A:

FIG. 8a is an image comprising several zones of 7 different textures. Two examples of each of the textures have been processed and used for the creation of the examples file.

The coefficients of a network of automata have been determined on the basis of these examples so that the 7 textures are characterized by a particular configuration of the outputs of the network.

Figure 8B:
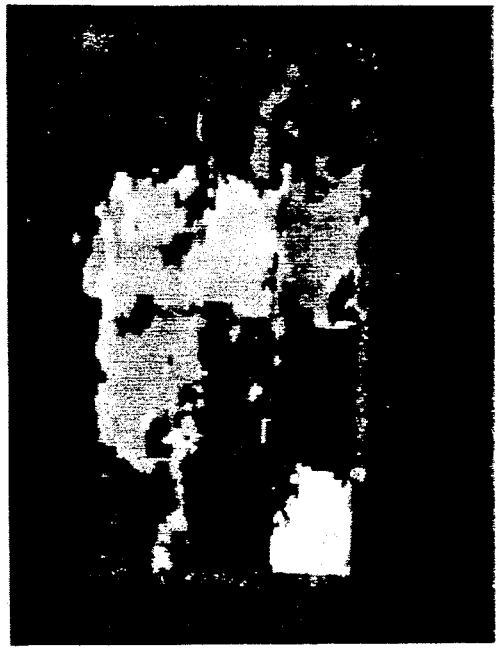

Then, the processing of the whole image has made it possible to obtain a classification of the image into zones depending on their textures, which is represented by the intermediate classification map of FIG. 8b and where each grey level represents a given texture, to which corresponding confidence values are associated as represented in FIG. 8c where the maximum confidence "1" is characterised by a white zone.

The confidence is less good of course in the transition zones between textures.

FIG. 8d illustrates the final classification taking account of the confidence and of the classification in the neighbourhood of a pixel (or of an elementary zone).

As indicated above the advantages of this method of classification and of the corresponding device are their simplicity and the fact that there is no restriction to a particular textural type since there is no modelling.

This method and the corresponding device for image segmentation by classification of textures can be applied for the segmenting of any image in which the regions are distinguishable by their textures, in particular to aerial images or to images of biological cells taken with a microscope.

The invention is not limited to the embodiment described and illustrated: in particular the values indicated above can be modified.

In particular it has been indicated that in the learning phase a coefficient characterising "the learning speed" $\eta$ is used for the computation of the variations in the weighting coefficients. A useful improvement may be the dynamic adjusting of this learning speed. For if its value is too low the learning phase will converge only very slowly, but on the other hand, if it is too high, there will be no linearisation of the system about the operating point. In consequence an additional characteristic of the invention consists in initialising the learning phase with a fairly low value of learning speed, and in applying, as the learning progresses, an automatic adjusting rule which makes it possible to increase this speed when convergence is satisfactory. In consequence, in the learning phase, the learning speed is dynamically readjusted after each presentation of the set of examples from the examples file. Moreover, each example is allocated its own learning speed, this making it possible to concentrate on the most "difficult" to learn examples. Thus, the example which created the highest error E is marked out and for this example the learning speed is multiplied by a coefficient m on examining whether the error has increased. Expressed mathematically, this rule for dynamic adjustment of the learning speed can be described in the following way:

For each presentation of the set of examples $$E_{max} = \max_{\text{examples}} \left( \max_j |O_j - S_j| \right) \text{for } j = 1 \text{ to } n_3$$

where
$O_j$ is the output value of the automation $A_j$ and where $S_j$ is the output value desired.
$ID_{ex}$ is the identity of the example which gave this maximum error $E_{max}$;
Equad is the quadratic error $$\sum_{\text{examples } j} (\Sigma(O_j - S_j)^2)$$

for the automata $A_j$ from $j=1$ to $n_3$ of the last level.
The devolution rule is as follows:
for the initialisation, for all the examples $\eta = \eta_0$, initial value furnished by the user.
After each presentation of the set of examples:
$\eta(ID_{ex})$ becomes $m.\eta (ID_{ex})$, ($m = 1 \times 1$ for example)
If then Equad > 1.01 Equad (preceding presentation), the learning speed $\eta$ is reduced to $\eta/m$ for all the examples.

What is claimed is:

1. A method for computer image analysis which classifies images according to their texture, comprising the steps of:
   creating a file comprising sets of characteristic values in which the sets of characteristic values correspond to exemplary textures;
   associating the set of characteristic values for each exemplary texture with a texture type;
   for each of the exemplary textures of the file, adjusting weighting coefficients of a network of automata in accordance with the sets of characteristic values so that when any one of the exemplary textures has been input into the network an output configuration of the network corresponds to a configuration, said configuration being characteristic of a texture type that is associated with the input exemplary texture;
   processing an image by computing image sets of characteristic values of zones of the image that are delimited by an observation window of the image;
   applying each image set of characteristic values to an input of the network of automata, thereby leading to an image output configuration of the network; and
   determining, from the image output configuration, a texture type to which the image output configuration corresponds; and
   determining an associated confidence value for the correspondence between an image zone and the determined texture type, said confidence value being a function of a disparity between the image output configuration and the output configuration of the determined texture type; and wherein the set of characteristic values which is representative of an exemplary texture or one of the image zones is a set of values of a normalized autocorrelation function of an illuminance of pixels of the exemplary texture or said one of the image zones computed for h×h pixel-sized correlation movements in a t×t pixel-sized sample observation window where t is an odd number, h being between 2 and t−2.

2. A method for computer image analysis which classifies images according to their texture, comprising the steps of:

creating a file comprising sets of characteristic values in which the sets of characteristic values correspond to exemplary textures;

associating the set of characteristic values for each exemplary texture with one member of a set of texture types;

for each of the exemplary textures of the file, adjusting weighting coefficients of a network of automata in accordance with the sets of characteristic values so that when any one of the exemplary textures has been input into the network an output configuration of the network corresponds to a configuration, said configuration being characteristic of a texture type that is associated with the input exemplary texture;

processing an image by computing image sets of characteristic values of zones of the image that are delimited by an observation window of the image;

applying each image set of characteristic values to an input of the network of automata, thereby leading to an image output configuration of the network;

determining from the image output configuration of the network, a texture type to which the image output configuration corresponds;

determining an associated confidence value for the correspondence between the determined texture type and an image zone, said confidence value being a function of a disparity between the image output configuration and the output configuration of the determined texture type; and wherein the set of adjusting weighting coefficients further comprises iterating in stages and, in each iteration, adjusting the weighting coefficients based upon an inverse function of an error gradient computed from differences between the output configuration obtained at an iteration stage and the configuration that is characteristic of the texture type associated with the input exemplary texture.

3. A method for computer image analysis which classifying images according to their texture, comprising the steps of:

creating a file comprising sets of characteristic values in which the sets of characteristic values correspond to exemplary textures;

associating the set of characteristic values for each of the exemplary textures with one of a set of texture types;

for each of the exemplary textures of the file, adjusting weighting coefficients of a network of automata in accordance with the sets of characteristic values so that when any one of the exemplary textures has been input into the network an output configuration of the network corresponds to a configuration, said configuration being characteristic of a texture type that is associated with the input exemplary texture;

processing an image by computing image sets of characteristic values of zones of the image that are delimited by an observation window of the image;

applying each image set of characteristic values to an input of the network of automata, thereby leading to an image output configuration of the network;

determining from the image output configuration, a texture type to which the image output configuration corresponds;

determining an associated confidence value for the correspondence between the determined texture type and an image zone, said associated confidence value being a function of a disparity between the image output configuration and the output configuration of the determined texture type;

moving the observation window n pixels by n pixels horizontally and vertically, thereby covering a whole image; and assigning to all the pixels of an elementary zone of n×n pixels surrounding a central pixel of the observation window, the texture type determined for the observation window.

4. A method for computer image analysis for determining the texture type of an image, comprising the steps of:

creating a file comprising sets of characteristic values in which the sets of characteristic values correspond to exemplary textures;

associating the set of characteristic values for each exemplary texture with one member of a set of texture types;

for each of the exemplary textures of the file, adjusting weighting coefficients of a network of automata in accordance with the sets of characteristic values so that when any one of the exemplary textures has been input into the network an output configuration of the network corresponds to a configuration, said configuration being characteristic of a texture type that is associated with the input exemplary texture;

processing an image by computing the image sets of characteristic values of zones of the image that are delimited by an observation window of the image;

applying each image set of characteristic values to an input of the network of automata, thereby leading to an image output configuration of the network;

determining from the image output configuration a texture type to which the image output configuration corresponds;

determining an associated confidence value for the correspondence of the determined texture type with an image zone, the associated confidence value being a function of a disparity between the image output configuration and the output configuration of the determined texture type; and assigning to a zone in a textural classification map of the image, which has a confidence level that is below a predetermined threshold, a majority texture type classification of neighboring zones of the map, wherein said majority texture type is determined based upon a weighting of pixels in the neighboring zones by their respective confidence values.

5. A computer based image analysis device which classifies images according to their texture, comprising:

means for creating a file comprising set of characteristic values in which each set comprises characteristic values corresponding to one exemplary texture;

means for associating the set of characteristic values for each exemplary texture with one member of a set of texture types;

means for adjusting weighting coefficients of a network of automata in accordance with the associated sets of characteristic values so that when any exemplary texture of the file is input into the network an output configuration of the network corresponds to a configuration, said configuration being characteristic of the texture type that is associated with the input exemplary texture;

means for processing an image by computing image sets of characteristic values of zones of the image that are delimited by an observation window of the image;

means for applying an image set of characteristic values for a zone to an input of the network of automata, thereby leading to a second output configuration of the network, wherein said means for processing comprises a data processor, the network of automata, and means for adjustably weighting the inputs of the automata of the network;

means for determining from the second output configuration a determined texture type and an associated confidence value, the associated confidence value being a measure of the correspondence between the determined texture type and an image zone, the associated confidence value being a function of a disparity between the second output configuration and the output configuration of the determined texture type; and wherein the network of automata is organized in several levels, including a first level comprising as many single-input automata as there are elements in a set of characteristic values for an exemplary texture or of an image zone, a second level comprising a lower number of automata than the number of exemplary textures for each texture type, each automaton in the second level having a number of inputs that is equal to the number of automata of the preceding level, and a last level comprising a number of automata that is equal to the number of different texture types, each automaton of the last level having a number of inputs that is equal to the number of automata of the preceding level.

6. A device according to claim 5, wherein:

the automata each comprise a weighted summing device connected to all the inputs of the automation, each input value being weighted by an adjustable weighting coefficient before the input values are summed, and each automation comprises a hyperbolic tangent function generator connected to the output of the summing device.

* * * * *

UNITED STATES PATENT AND TRADEMARK OFFICE
CERTIFICATE OF CORRECTION

PATENT NO. : 5,321,771
DATED : June 14, 1994
INVENTOR(S) : Gilles BUREL, et al.

It is certified that error appears in the above-indentified patent and that said Letters Patent is hereby corrected as shown below:

On the title page, Item [63] and Column 1, Lines 6 and 7, the PCT information has been omitted and should read as follows:

--Continuation of Ser. No. 700,188, May 30, 1991, filed as PCT/FR90/00698, Sep. 28, 1990, abandoned.--

Signed and Sealed this

First Day of November, 1994

Attest:

BRUCE LEHMAN

*Attesting Officer*

*Commissioner of Patents and Trademarks*